UNITED STATES PATENT OFFICE.

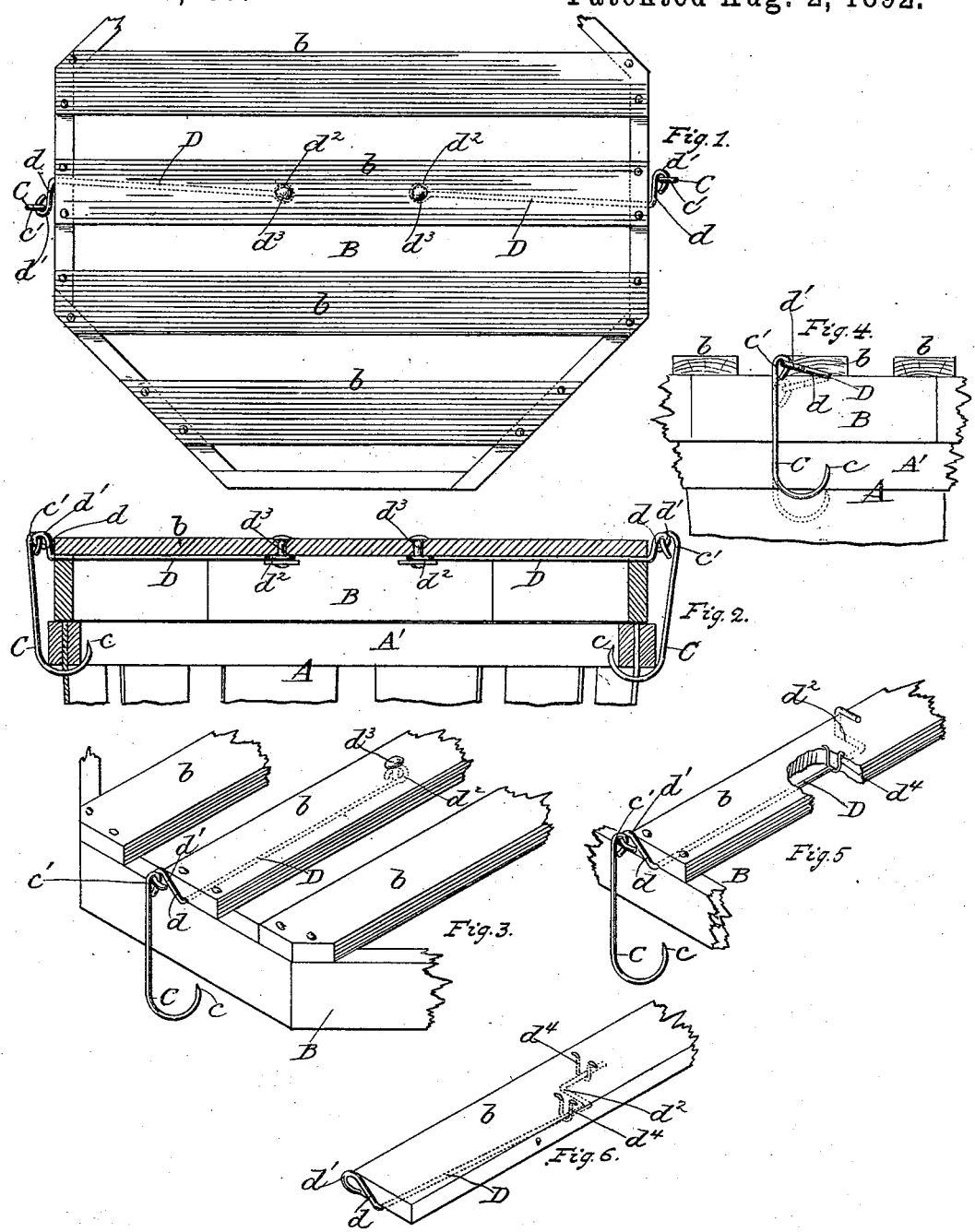

GEORGE C. GARBRANCE, OF WATERVLIET, NEW YORK.

FASTENING FOR BASKET-COVERS.

SPECIFICATION forming part of Letters Patent No. 479,797, dated August 2, 1892.

Application filed February 3, 1892. Serial No. 420,145. (No model.)

*To all whom it may concern:*

Be it known that I, GEORGE C. GARBRANCE, a citizen of the United States, residing in the town of Watervliet, in the county of Albany and State of New York, have invented certain new and useful Improvements in Fastenings for Basket-Covers; and I do hereby declare the following to be a full, clear, and exact description of the invention, such as will enable others skilled in the art to which it appertains to make and use the same.

My invention relates to devices for fastening covers to vegetable and fruit baskets, and is intended to be an improvement on the fastening devices described in Letters Patent No. 464,686, granted to me December 8, 1891; and it consists in the combinations of devices and parts hereinafter particularly described, and specifically set forth in the claims.

The objects of my invention are to produce a fastening device which will be elastic from the torsional strain on a wire arm securely held to a slat of the basket-cover and allow a hook secured to such arm to be depressed at will of an operator for engaging a sharp end of the hook with a rim or other piece of the basket; also, to combine with each of a pair of hooks an arm which will extend in a direction from the outer marginal edge of the cover toward the center of the same and have their inner ends securely held from turning, while their outer lever ends, provided each with a hook, may be turned about the horizontal axis of the arms the said hooks are jointed with, so that the said hooks may be depressed at will for engaging or disengaging the same with the rim or other part of the basket. I attain these objects by the means illustrated in the accompanying drawings, forming a part of this specification, in which—

Figure 1 is a plan view of a pair of fastening devices embodying the improvements in my invention, with the cover parts indicated by dotted lines. Fig. 2 is a sectional view of a basket-cover, a section of a basket, and my improved fastening devices holding the cover secured to the basket. Fig. 3 is a perspective view of a fastening device and illustrating the same applied to the cover. Fig. 4 is a side view of a cover and basket, shown by sections, with the hook and outer lever of the attaching-arm in front view and illustrating the manner of engaging and disengaging the hook with the rim of the basket. Fig. 5 is a perspective view of a form of inner-end-holding piece, which may be made with the attaching-arm; and Fig. 6 is a view of another form of modification of the inner-end-holding element of the attaching-arm which may be used.

The same letters of reference refer to like parts throughout the several views.

In the drawings, A represents a basket. B is a cover of the same. C C are hooks for securing the latter with the former, and D D are elastic arms, which hold the hooks C C jointed with the cover, so as to allow them to be readily engaged with the basket or be disengaged therefrom.

The cover B may be of any known form of construction which will adapt it for use on the top side of the rim A' of the basket. The drawings, Figs. 1 and 2, show a cover composed of the rim B' and top slats $b$ $b$, suitably secured to said rim.

The hooks C are each made of stiff wire of suitable diameter—as, say, size Nos. 15 to 20—according to the size of the basket to which a pair of these hooks are to hold a cover secured. The turned-up end of each hook is made with the sharp point $c$, preferably by cutting the wire diagonally, as at an angle of, say, about forty-five (45) degrees. The opposite ends of these hooks are provided each with an eye $c'$ for loosely securing them with the respective elastic arms by which they are jointed with the cover. These hooks C are suitably jointed each with an elastic arm D.

The arms D D are each made of stiff wire of about the same diameter as the wire from which the hooks are made. These arms are made with such a length as to extend from the outer edge of the cover inwardly to about a distance of five inches, more or less, according to the diameter and stiffness of the wire, and they are each preferably made the duplicate of the other. These arms are each provided with, at their outer ends, a lever $d$, which lever is integral with the arm D it is to operate, and has at its outer end a loop $d'$, by which a hook C is jointed with the arm D it operates with. The inner or opposite ends of these arms D have each integral with it a holding device $d^2$, made in any suitable form and provided with any suitable means for effecting a secure holding of said arms with the cover or a slat of the cover. This device $d^2$ is shown in Figs. 1, 2, and 3 to be in the form of a loop or eye made integral with the inner end of the arm and receiving a suitable rivet $d^3$ for holding it secure with a slat $b$.

Fig. 5 shows arm D to have its holding device made with an angular form, so as to have bearing against the lower side of the slat and a holding of the same by receiving in a recess an edge margin of the slat, while a staple $d^4$ holds the arm in place.

In Fig. 6 the holding device $d^2$ is shown to be made with an angular form and integral with said arm D and held in place by two staples $d^4$ $d^4$. A particular form of this holding-piece is not essential, so long as it may be secured tightly to the slat, and will hold the arm D from swiveling and permit it to be twisted partly about its axis when the lever $d$ is depressed from position of full lines in Fig. 4 to that of dotted lines in the same figure. This twisting of the arm D effects in it a torsional strain, which through the lever $d$ operates as an elastic element in this fastening device for holding the hook C with great force when engaging with the rim A′ or other part of the basket.

Although the above-described improvements operate to permit the hook C to hold by their bows with the rim A′ of the basket, as shown in Fig. 2, yet by the use of the sharp points $c$ these hooks are adapted to be used with rims—such as are employed with baskets having paper-board bodies—so as to engage by the said points $c$ with the lower side of said rim, as indicated by dotted lines in Fig. 4.

This fastening device may be used for securing removable covers of boxes, baskets, or crates for holding vegetables or other articles.

Having described my invention, what I claim, and desire to secure by Letters Patent, is—

1. In a fastening device for securing covers to baskets, the combination, with a hook, of the elastic arm adapted to be twisted and having in its outer end the lever $d$, provided with a loop or eye by which said hook is jointed with the said arm and having in its opposite or inner end a holding device $d^2$, provided with means described for rigidly securing it with the cover, substantially as and for the purposes set forth.

2. In a fastening device for securing covers to baskets, the combination, with the arm D, having in its inner end the means for effecting a secure holding of the said arm with the cover when said arm is subjected to a twisting or torsional strain and having integral with its outer end lever $d$, provided with an eye or loop, of the hook C, having its bow provided with the sharp point $c$, for operation substantially as and for the purposes set forth.

3. The combination, with a basket having a top rim and a cover calculated to be seated on said rim, of the arms D D, provided at their outer ends with levers $d$ and having their inner ends rigidly secured to the cover, and the hooks C, jointed, respectively, with said arms by the said levers $d$, with the said arms adapted to be twisted when their levers are turned about their axes, substantially as and for the purposes set forth.

In testimony that I claim the invention above set forth I affix my signature in presence of two witnesses.

GEORGE C. GARBRANCE.

Witnesses:
CHARLES SELKIRK,
A. SELKIRK, Jr.